United States Patent [19]

Solow

[11] Patent Number: 4,712,639

[45] Date of Patent: Dec. 15, 1987

[54] AUTOMOBILE ANTI-THEFT DEVICE

[75] Inventor: Joseph E. Solow, Plainview, N.Y.

[73] Assignee: Wolo Manufacturing Corp., Deer Park, N.Y.

[21] Appl. No.: 13,392

[22] Filed: Feb. 11, 1987

[51] Int. Cl.⁴ ............................................. E05B 17/14
[52] U.S. Cl. ................................... 180/287; 70/18; 70/424
[58] Field of Search .................... 180/287; 70/18, 237, 70/252, 254, 424, 428

[56] References Cited

U.S. PATENT DOCUMENTS

| | | | |
|---|---|---|---|
| 3,811,303 | 5/1974 | Robertson | 70/18 |
| 3,916,658 | 11/1975 | Barry | 70/417 |
| 4,008,589 | 2/1977 | Harrell | 70/424 |
| 4,104,895 | 8/1978 | Tankel | 180/287 |
| 4,118,961 | 10/1978 | Lee | 70/18 |
| 4,304,111 | 12/1981 | Nolin | 70/18 |
| 4,317,346 | 3/1982 | Gutman | 70/238 |
| 4,494,391 | 1/1985 | Solow | 70/428 |
| 4,505,140 | 3/1985 | Solow | 70/18 |
| 4,559,795 | 12/1985 | Zagoroff | 70/422 |

OTHER PUBLICATIONS

Brochure, Steadfast 1985.

Primary Examiner—David M. Mitchell
Assistant Examiner—Ross Weaver
Attorney, Agent, or Firm—Brumbaugh, Graves Donohue & Raymond

[57] ABSTRACT

An automobile anti-theft device is provided with a first cover which fits over a steering column-mounted ignition lock, a second cover which fits over the turn signal housing on the steering column, opposite the lock, and a flexible element that extends from one end of the first cover, wraps around the steering column over the second cover, and locks in the other end of the first cover.

4 Claims, 5 Drawing Figures

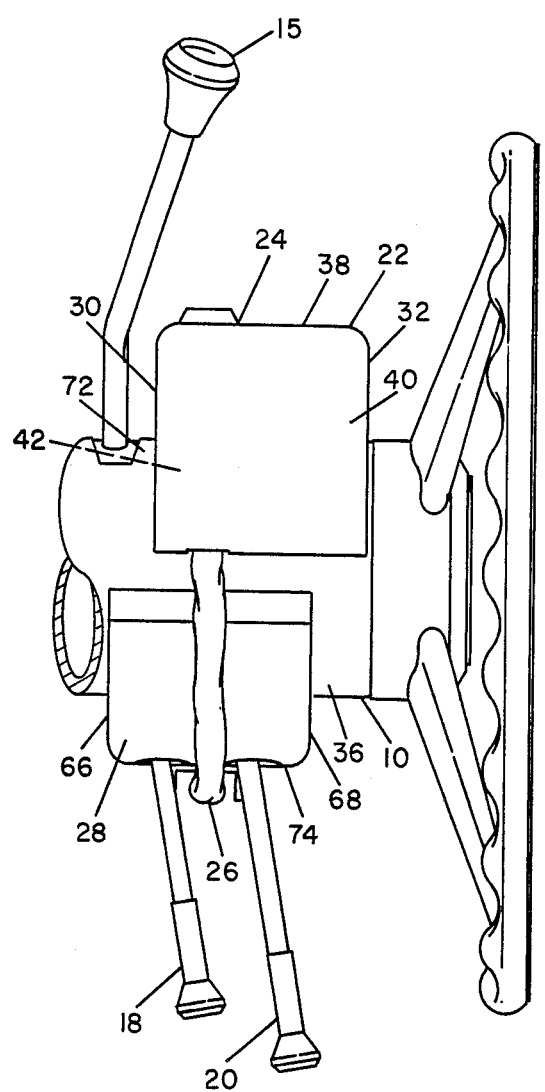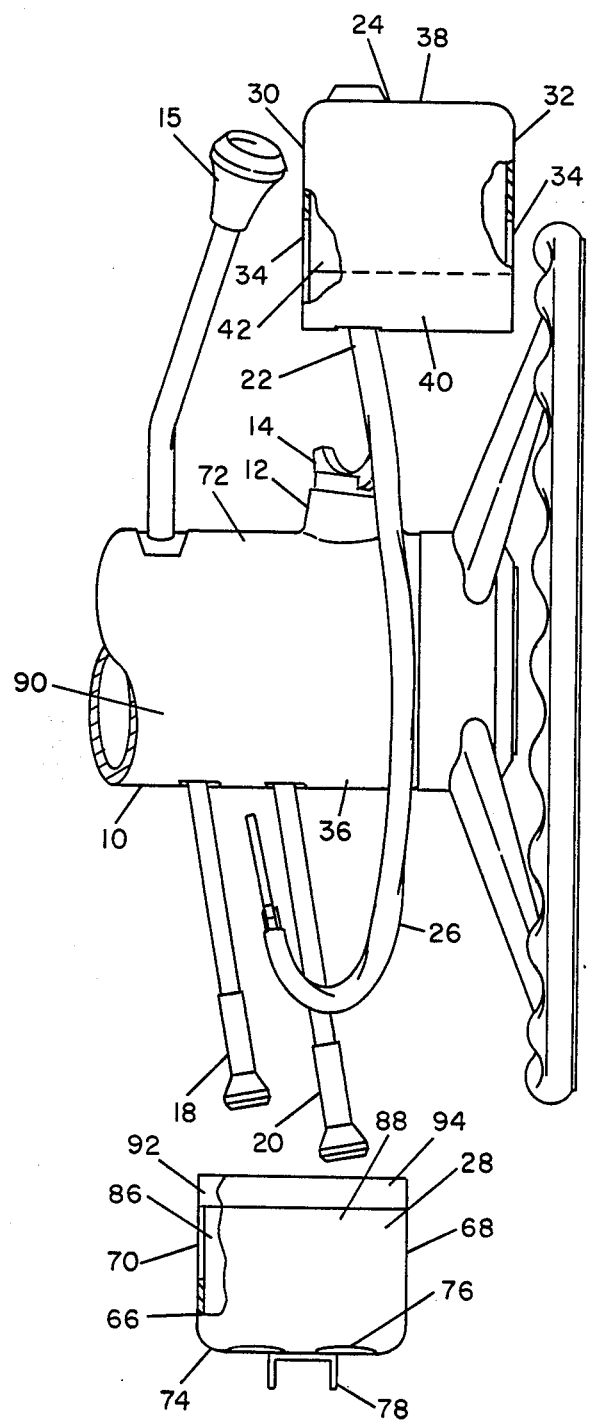
FIG. 1
FIG. 2

AUTOMOBILE ANTI-THEFT DEVICE

FIELD OF THE INVENTION

The present invention is an automobile anti-theft device for steering columns containing an ignition lock and column-mounted lever(s) for activating the turn signals and bright lights.

BACKGROUND OF THE INVENTION

Most present day automobiles contain an ignition lock mounted in the steering column below the steering wheel. The lock functions both as an ignition cut-off and to prevent turning of the steering wheel. In practice, however, a thief can readily defeat an ignition lock by using a master key or a device which pulls the lock, such as a dent puller, to expose the ignition wires.

Wolo Manufacturing Corporation, the assignee of this application, presently sells a device which protects the ignition lock from tampering. In this device, which is shown and described more fully in my prior U.S. Pat. No. 4,494,391, a steering lock protective cover fits over the ignition lock flush against the steering column, and is held firmly against the steering column by a flexible chain element secured at opposite ends of the housing. This device is easy to use and has proven to be extremely effective.

While this device protects the ignition lock, determined automobile thieves have found that it is sometimes possible to bypass the ignition lock altogether, and to gain access to the ignition wires from the side of the steering column opposite the lock.

One way of improving the effectiveness of my anti-theft device against such tampering is disclosed in my pending U.S. patent application Ser. No. 802,870. In addition to protecting the steering column ignition lock, this device prevents the operation of the gear shift lever by means of a gear shift lock bar so that, even if the lock is bypassed and the ignition is hot-wired, the car cannot be driven.

SUMMARY OF THE INVENTION

The present invention is another improvement to my prior U.S. Pat. No. 4,494,391, that protects a steering column ignition lock from tampering and prevents automobile thieves from gaining access to the ignition wires from the side of the steering column opposite the lock. This device is effective also in cars that do not have the gear shift lever mounted on the column.

In accordance with the present invention, there is provided a first cover having a hollow interior space open on one side. The open side is defined by laterally separated side walls having arcuate edge surfaces spacing opposite ends of the first cover, thereby being adapted to fit over a portion of a steering column containing an ignition lock. A tension bearing element is attached to one end of the first cover, wraps around the steering column and over a second cover fitted over a portion of the steering column opposite the lock, and is releasably attached to the other end of the first cover.

A device according to the invention also includes a second cover that has a hollow interior space and an open bottom. Its top includes at least one opening, thereby permitting the second cover to receive the turn signal and bright light activating lever(s). The second cover includes opposed end walls, having arcuate edge surfaces spacing opposite sides of the second cover, which allow the second cover to fit over the turn signal housing and rest flush against the steering column. The second cover also includes opposed side walls, adapted to fit along a portion of the steering column.

In a preferred embodiment, the top wall of the second cover includes a U-shape channel attached to the second cover top, with its open side facing away from the top wall. This channel receives a portion of the tension bearing element and constrains the element against lateral movement when the device is in use. Preferably, the tension bearing element is flexible, for example, the flexible chain element disclosed in my prior U.S. Pat. No. 4,494,391.

Preferably, the bottom portions of either the side walls or the end walls of the second cover are provided with an adhesive, thereby permitting the second cover to be permanently affixed to the side of the steering column opposite the lock.

In use, the first cover fits over the ignition lock and the second cover fits over the turn signal housing on the opposite side. The arcuate portions of the first and second covers rest flush against the steering column, the second column affixed to the steering column by means of an adhesive included on the bottom portions of either its side or end walls. The tension bearing element extends from the first cover, wraps around the steering column and over the second cover, is received in the second cover top channel, and locks securely in the other end of the first cover, thus holding the anti-theft device firmly in place. Accordingly, the second cover is held firmly against the steering column, overlying the turn signal housing, by the tension of the chain. The second cover protects the turn signal housing, which can otherwise be removed or damaged to gain access to the ignition wires, and a thief cannot access the ignition wires through either the ignition lock or side of the steering column opposite the lock.

As discussed in U.S. Pat. No. 4,494,391, the chain element in the preferred embodiment of the device is held, at its free end, within the cover, by both a locking mechanism and projecting portions on the cover itself. Accordingly, it is extremely difficult to pry loose or remove the chain. The chain is held in place on the second cover in the U-shape channel, which constrains it against movement sideways. Thus, the second cover, affixed to the steering column and encircled by the chain, is tamper resistant.

For a better understanding of the invention, reference is made to the following detailed description of a preferred embodiment, taken in conjunction with the drawings accompanying the application.

BRIEF DESCRIPTION OF THE DRAWINGS

FIG. 1 is a side view of an anti-theft device in accordance with the present invention, shown positioned on an automobile steering column;

FIG. 2 is an exploded side view of the anti-theft device of FIG. 1, shown with an automobile steering column;

DETAILED DESCRIPTION OF THE PREFERRED EMBODIMENT

Figure 3:
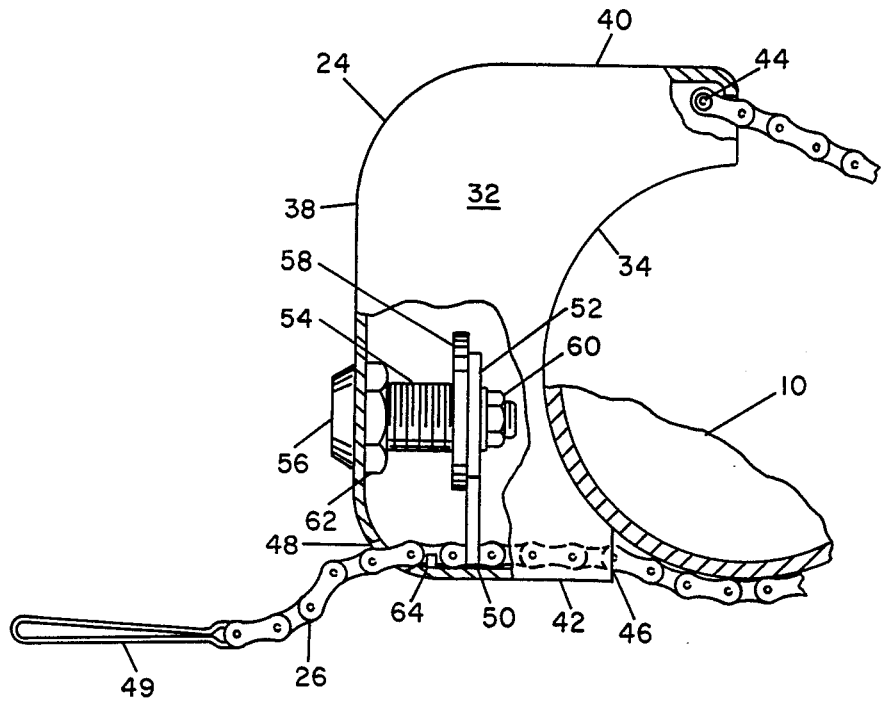
FIG. 3 is a side view, partially in section, of the first cover of the anti-theft device of FIG. 1.

For purposes of illustrating the invention, a typical automobile steering column 10 is shown in FIGS. 1 and 2. Steering column 10 includes a boss 12 in which is mounted an ignition lock 14 and a turn signal housing 16, from which turn signal and bright light activating levers 18 and 20, respectively, project. In typical automobile applications, the ignition lock 14 also locks the steering column 10. In some automobiles, lever 20 activates both the turn signal and bright lights, and lever 18 is not present. A gear shift lever 15 is also mounted in steering column 10.

The anti-theft device 22 in accordance with the present invention includes three pieces: a first cover 24, a flexible tension bearing element 26, and a second cover 28.

The first cover 24 is formed with one side open, and a pair of opposed side walls 30, 32 which include arcuate edges 34 adapted to wrap around a portion of the outer cylindrical surface 36 of steering column 10. An outer wall 38 is arranged perpendicular to side walls 30, 32 at the edges away from edges 34. First cover 24 also includes top 40 and bottom 42 walls arranged perpendicular to outer wall 38 and to side walls 30, 32.

The flexible tension bearing element 26 is preferably a link chain such as a double strand link chain. Chain 26 is fixed at one end by pivot pin 44 (FIG. 3) to first cover 24 at upper wall 40. Arcuate sections 34 are formed to space lower wall 42 from steering columns 10 to define an opening 46 such that chain 26 may be inserted into first cover 24 between lower wall 42 and steering column 10. As shown in FIGS. 1-3, chain 26 is wrapped around steering column 10 and second cover 28, inserted into first cover 24, and locked therein to affix the anti-theft device 22 to steering column 10.

Referring to FIG. 3, chain 26 is directed through the interior of first cover 24 and extends out through a front opening, transverse slot 48, in the first cover. When the chain 26 is inserted through first cover 24 and pulled through transverse slot 48, chain 26 may thereafter be pulled taut out of first cover 24 through slot 48 so that first cover 24 is held securely against steering column 10. To facilitate insertion through first cover 24, a lead 49 made of metal or other relatively stiff material may be attached to the end of chain 26.

The chain 26 is selectively engaged by a pair of projections 50 on a plate 52 movable up and down by a rotating shaft, disposed in barrel 54, of lock 56. A cam 58 is fixed on the rotating shaft and the assembly is held in place by nut 60. Lock 56 is secured against first cover 24 by nut 62. When lock 56 is rotated, an eccentric projection on element 58 engages a cooperating portion on plate 52 so as to move projections 50 up and down, into or out of engagement between cross-links of chain 26. The foregoing represents a simplified description of a preferred locking arrangement for the tension bearing element 26 shown in U.S. Pat. No. 4,494,391. Preferably, projections 50 include a portion to hold chain 26 down against the surface of bottom plate 42, and back stops 64 formed in bottom plate 42 are provided to cooperate with projections 50 to lock chain 26 in place.

Figure 5:
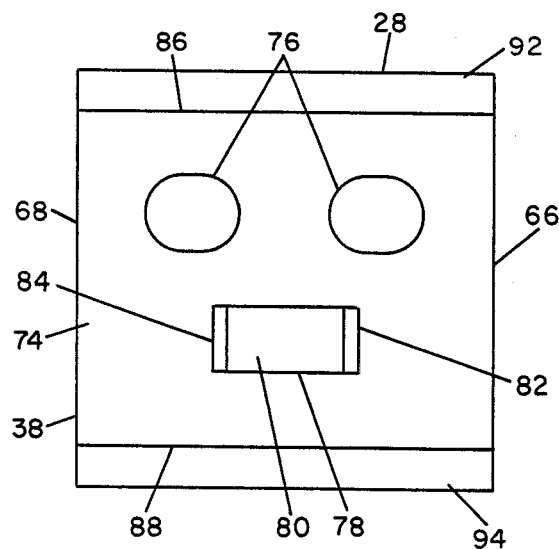
FIG. 5 is a top view of the second cover of the anti-theft device of FIG. 1.
Figure 4:
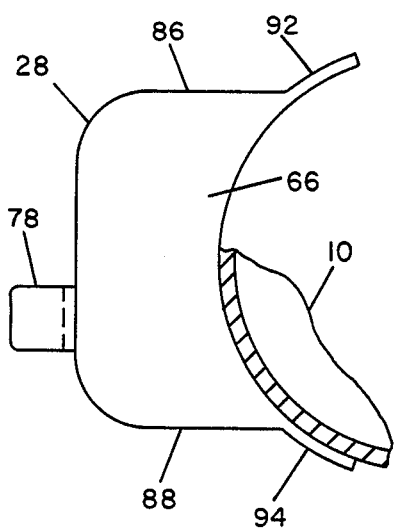
FIG. 4 is a side view of the second cover of the anti-theft device of FIG. 1.

The second cover 28 is formed with an open bottom, and a pair of opposed end walls 66, 68 which include arcuate edges 70 adapted to wrap around a portion of the outer cylindrical surface 72 of steering column 10. A top wall 74 is arranged perpendicular to end walls 66, 68 at the edges away from edges 70. Top wall 74 includes openings 76, permitting levers 18, 20 to be received by second cover 28. The opening for at least the turn signal lever is elongated to permit the levers to move in their ordinary manner when second cover 28 is in place. Top wall 74 also includes a U-shape channel piece 78 with base 80 and opposed rectangular side walls 82, 84 (FIGS. 4 and 5). As shown in FIG. 1, channel 78 receives a portion of chain 26. While chain 26 is free to slide longitudinally within channel 78, thus permitting the chain to be easily pulled tight around the steering column, the channel side walls 82, 84 constrain chain 26 laterally when device 22 is in use. Second cover 28 also includes opposed side walls 86, 88 adapted to fit along a portion of the outer cylindrical surface 90 of steering column 10. The bottom portions 92, 94 of side walls 86, 88, or if desired the bottom portions of end walls 66, 68 are provided with an adhesive for permanently affixing second cover 28 to steering column 10.

To use, second cover 28 is placed over levers 18, 20 and turn signal housing 16, and affixed to steering column 10 by exposing the adhesive, for example, commercially available double-sided tape, on bottom portions 92, 94 and pressing second cover 28 against steering column 10. Since second cover 28 is permanently affixed to steering column 10, this step need not be repeated during subsequent use of device 22. First cover 24 is fitted over ignition lock 14. Then, chain 26 is wrapped around steering column 10 and second cover 28, passing through channel 78, is inserted into first cover 24 above bottom wall 42, and pulled taut through back opening 48. The lock shaft, disposed in barrel 54, is rotated to move plate 52 and projections 50 into engagement with chain 26 and lock chain 26 in place.

As is apparent in FIG. 1, when device 22 is attached to steering column 10, and chain 26 is pulled taut, seated in receptacle 78, and locked in place, ignition lock 14 and turn signal housing 16 are protected by first cover 24 and second cover 28, respectively. Thus, in addition to protecting ignition lock 14 from tampering, device 22, by means of second cover 26, prevents automobile thieves from accessing the ignition wires through housing 16. Second cover 28 cannot be removed simply by breaking the bond between second cover 28 and steering column 10 because chain 26 is wrapped around second cover 28. Chain 26 cannot be slid off the top 74 of second cover 28 because it is constrained laterally by channel 78.

The foregoing represents a description of the preferred embodiment of the invention. Variations and modifications will be apparent to persons skilled in the art, without departing from the inventive concepts disclosed herein. All such modifications and variations, to the extent they fall within the inventive principles disclosed herein, form part of the invention as defined in the following claims.

I claim:

1. An automobile anti-theft device for protecting a steering column ignition lock, comprising:
    a first cover having a hollow interior space and being open on one side, the open side having arcuate surfaces spacing opposite ends of said first cover, thereby being adapted to fit over a portion of a steering column containing an ignition lock;
    a tension bearing element;
    means for attaching one end of said element to one end of said first cover to permit the remaining portion to wrap around the steering column and a second cover;

means for releasably attaching said element to the other end of said first cover;

a second cover having opposed end walls with arcuate edges adapted to wrap around a portion of the steering column, a top wall arranged perpendicular to said opposed edges at the edges away from said arcuate edges, with at least one opening permitting a turn signal lever to be received by said second cover, opposed side walls, adapted to fit along a portion of the steering column, and an open bottom, wherein said second cover has a hollow interior adapted to fit over a turn signal housing; and constraining means on the second cover top wall for receiving said tension bearing for constraining said tension bearing element against lateral movement, whereby said first cover may be placed over a steering column ignition lock, said second cover may be fitted over the turn signal housing, and said tension bearing element can be wrapped around the steering column, engaging said constraining means, and attached to the other end of the cover for retaining said first and second covers against the steering column.

2. An automobile anti-theft device as defined in claim 1, wherein said constraining means is a U-shape channel, having a base attached to said top wall, opposed rectangular side walls extending away from said base, an open top and two open sides, wherein said channel receives said element and constrains said element laterally.

3. An automobile anti-theft device as defined in claim 1, comprising means for adhering said second cover to a steering column.

4. An automobile anti-theft device as defined in claim 2, comprising means for adhering said second cover to a steering column.

* * * * *